(12) United States Patent
Baron et al.

(10) Patent No.: US 9,134,977 B2
(45) Date of Patent: Sep. 15, 2015

(54) COMPILER OPERATION FOR HANDLING CONDITIONAL STATEMENTS

(75) Inventors: Jason I. H. Baron, Bedford, MA (US); Richard Henderson, Campbell, CA (US); Roland McGrath, Berkeley, CA (US)

(73) Assignee: Red Hat, Inc., Raleigh, NC (US)

( * ) Notice: Subject to any disclaimer, the term of this patent is extended or adjusted under 35 U.S.C. 154(b) by 1115 days.

(21) Appl. No.: 12/714,236

(22) Filed: Feb. 26, 2010

(65) Prior Publication Data
US 2011/0214110 A1    Sep. 1, 2011

(51) Int. Cl.
*G06F 9/45*    (2006.01)

(52) U.S. Cl.
CPC ...................... *G06F 8/443* (2013.01)

(58) Field of Classification Search
CPC ................ G06F 8/433; G06F 8/443–8/4442
See application file for complete search history.

(56) References Cited

U.S. PATENT DOCUMENTS

| | | | | |
|---|---|---|---|---|
| 4,309,756 A * | 1/1982 | Beckler | | 717/155 |
| 4,821,181 A * | 4/1989 | Iwasawa et al. | | 717/106 |
| 5,511,198 A * | 4/1996 | Hotta | | 717/156 |
| 5,583,983 A * | 12/1996 | Schmitter | | 717/138 |
| 5,604,895 A * | 2/1997 | Raimi | | 703/13 |
| 5,613,118 A * | 3/1997 | Heisch et al. | | 717/158 |
| 5,659,752 A * | 8/1997 | Heisch et al. | | 717/158 |
| 5,732,273 A * | 3/1998 | Srivastava et al. | | 717/128 |
| 5,819,097 A * | 10/1998 | Brooks et al. | | 717/141 |
| 5,854,932 A * | 12/1998 | Mariani et al. | | 717/116 |
| 5,857,104 A * | 1/1999 | Natarjan et al. | | 717/158 |
| 5,881,290 A * | 3/1999 | Ansari et al. | | 717/136 |
| 5,999,732 A * | 12/1999 | Bak et al. | | 717/148 |
| 6,014,513 A * | 1/2000 | Voelker et al. | | 717/131 |
| 6,026,235 A * | 2/2000 | Shaughnessy | | 717/127 |
| 6,249,907 B1 * | 6/2001 | Carter et al. | | 717/129 |
| 6,289,507 B1 * | 9/2001 | Tanaka et al. | | 717/155 |
| 6,292,934 B1 * | 9/2001 | Davidson et al. | | 717/158 |
| 6,427,234 B1 * | 7/2002 | Chambers et al. | | 717/140 |
| 6,662,354 B1 * | 12/2003 | Krablin et al. | | 717/140 |
| 6,684,389 B1 * | 1/2004 | Tanaka et al. | | 717/140 |
| 6,817,013 B2 * | 11/2004 | Tabata et al. | | 717/151 |
| 6,839,893 B2 * | 1/2005 | Bates et al. | | 717/124 |
| 6,948,164 B2 * | 9/2005 | Tinker | | 717/168 |
| 6,966,057 B2 * | 11/2005 | Lueh | | 717/158 |

(Continued)

OTHER PUBLICATIONS

Jonathan B. Rosenberg, How Debuggers Work, publihsed by Wiley Computer Publishing, 1996, p. 98-102, 107-111, 118-119.*

*Primary Examiner* — Tuan Q. Dam
*Assistant Examiner* — Zheng Wei
(74) *Attorney, Agent, or Firm* — Lowenstein Sandler LLP

(57) ABSTRACT

A computer-implemented method and apparatus for optimizing conditional code by identifying conditional code in a source code, adding a no-operation instruction to an executable code corresponding to the source code in place of the conditional code, adding an entry to a table to pair the no-operation instruction to the conditional code, compiling the conditional code, and storing the compiled conditional code separate from the executable code. A computer-implemented method and apparatus to optimize conditional code by loading an executable code to be executed, checking whether conditional code associated with the executable code is enabled for execution, looking up a location of a no-operation instruction in a table and a location of a compiled conditional code in the table, and replacing the no-operation instruction in the executable code with the compiled conditional code.

20 Claims, 3 Drawing Sheets

(56) References Cited

U.S. PATENT DOCUMENTS

| | | | |
|---|---|---|---|
| 6,968,545 B1* | 11/2005 | Krech et al. | 717/153 |
| 7,020,873 B2* | 3/2006 | Bik et al. | 717/156 |
| 7,389,494 B1* | 6/2008 | Cantrill | 717/125 |
| 7,409,677 B1* | 8/2008 | Leventhal et al. | 717/130 |
| 7,421,687 B1* | 9/2008 | Yellin et al. | 717/148 |
| 7,434,004 B1* | 10/2008 | Spracklen et al. | 711/137 |
| 7,484,205 B2* | 1/2009 | Venkatapathy | 717/158 |
| 7,530,057 B2* | 5/2009 | Babcock | 717/129 |
| 7,568,186 B2* | 7/2009 | Bhattacharya | 717/130 |
| 7,665,076 B2* | 2/2010 | Clement et al. | 717/148 |
| 7,743,370 B1* | 6/2010 | Krablin et al. | 717/156 |
| 7,779,394 B2* | 8/2010 | Homing et al. | 717/136 |
| 7,805,717 B1* | 9/2010 | Spertus et al. | 717/158 |
| 7,854,002 B2* | 12/2010 | Mohanan et al. | 726/22 |
| 7,882,493 B2* | 2/2011 | Uehara et al. | 717/124 |
| 8,037,459 B2* | 10/2011 | Mavinakayanahalli et al. | 717/129 |
| 8,060,869 B1* | 11/2011 | Panchenko et al. | 717/158 |
| 8,161,463 B2* | 4/2012 | Johnson et al. | 717/136 |
| 8,161,465 B2* | 4/2012 | Yang et al. | 717/140 |
| 8,245,210 B2* | 8/2012 | Ng et al. | 717/153 |
| 8,402,444 B2* | 3/2013 | Ball et al. | 717/128 |
| 2001/0052120 A1* | 12/2001 | Babaian et al. | 717/9 |
| 2002/0026633 A1* | 2/2002 | Koizumi et al. | 717/146 |
| 2002/0073398 A1* | 6/2002 | Tinker | 717/110 |
| 2002/0144245 A1* | 10/2002 | Lueh | 717/140 |
| 2002/0162093 A1* | 10/2002 | Zhou et al. | 717/130 |
| 2002/0194580 A1* | 12/2002 | Ramasamy et al. | 717/130 |
| 2003/0079206 A1* | 4/2003 | Bates et al. | 717/129 |
| 2003/0079214 A1* | 4/2003 | Ghobrial et al. | 717/158 |
| 2004/0019770 A1* | 1/2004 | Kawahito | 712/227 |
| 2004/0093590 A1* | 5/2004 | Lam | 717/151 |
| 2004/0111710 A1* | 6/2004 | Chakradhar et al. | 717/136 |
| 2004/0205739 A1* | 10/2004 | Haber et al. | 717/151 |
| 2005/0183072 A1* | 8/2005 | Horning et al. | 717/140 |
| 2005/0204348 A1* | 9/2005 | Horning et al. | 717/140 |
| 2005/0251795 A1* | 11/2005 | Fernandez et al. | 717/151 |
| 2005/0268293 A1* | 12/2005 | Kawahito et al. | 717/154 |
| 2006/0101441 A1* | 5/2006 | Fulton et al. | 717/158 |
| 2008/0028373 A1* | 1/2008 | Yang et al. | 717/140 |
| 2008/0288915 A1* | 11/2008 | Krablin et al. | 717/104 |
| 2009/0007086 A1* | 1/2009 | Kawahito et al. | 717/154 |
| 2009/0044176 A1* | 2/2009 | Cascaval et al. | 717/128 |
| 2009/0064118 A1* | 3/2009 | Raber | 717/159 |
| 2009/0113403 A1* | 4/2009 | Davis et al. | 717/146 |
| 2009/0307667 A1* | 12/2009 | Booth et al. | 717/128 |
| 2010/0058301 A1* | 3/2010 | Myles et al. | 717/142 |
| 2010/0262839 A1* | 10/2010 | Eker et al. | 713/190 |
| 2010/0287539 A1* | 11/2010 | Park et al. | 717/130 |
| 2011/0035733 A1* | 2/2011 | Horning et al. | 717/140 |
| 2011/0078424 A1* | 3/2011 | Boehm et al. | 712/234 |

* cited by examiner

COMPILER OPERATION FOR HANDLING CONDITIONAL STATEMENTS

TECHNICAL FIELD

The embodiments of the invention relate to a method and apparatus for optimizing the use of conditional code. Specifically, the embodiments of this invention relate to a method and apparatus for minimizing the overhead required for conditional code by patching the compiled code at run-time.

BACKGROUND

Conditional code such as traces are often used in applications and other programs. These conditional segments of code can even be used in operating system kernels. Conditional code segments are only executed when associated conditions are met. Often a variable is associated with the conditional code segments. The conditional code segments are executed when the variable is set or has a specific value.

During the execution of the program that contains conditional code, upon encountering the conditional code, the associated variable is checked to determine whether it is set. If the variable is set then the conditional code is executed. If the variable is not set, then the conditional code is not executed. However, in either case, the conditional code is loaded into the instruction cache and creates other additional overhead in the execution of the program.

Traces are an example of a type of conditional code that is frequently used in programs. Traces are used for diagnostic purposes to identify and track the condition of the program in which the trace resides during its execution. These traces are enabled during diagnostic checks on a program or during debugging operations. In normal operation, these traces are not executed. The more traces that can be inserted into a program, the greater the level of detail and the higher the level of granularity of information about the program that can be obtained in the diagnostic and debugging processes. However, the more traces and associated trace code that is utilized in a program, the lower the processor efficiency due to the overhead in the execution of the program caused by loading the trace code into the processor and the space the trace code occupies in caches.

BRIEF DESCRIPTION OF THE DRAWINGS

Embodiments of the present invention are illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
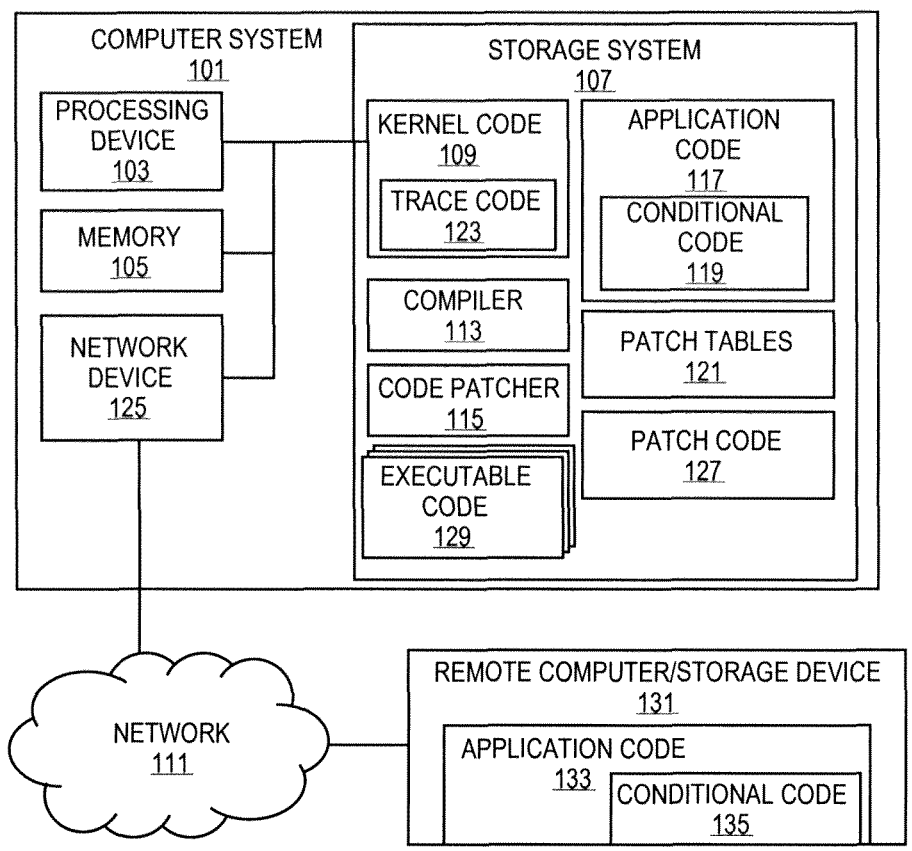
FIG. 1 is a diagram of one embodiment of a system for the optimization of conditional statements.

FIG. 1 is diagram of one embodiment of a system for the optimization of conditional statements or code. In one embodiment, the system includes a computer system 101. The computer system 101 can be any type of computing device including any desktop computer, server, work station, hand held computer or similar computing device. The computer system 101 can include a processing device 103, a memory 105 and a storage system 107 and similar components.

The processing device 103 can be any type of computer processor including a general purpose processor such as a central processing unit (CPU), an application specific integrated circuit (ASIC) or similar processing device. The processing device 103 can execute the code stored in the storage system 107. This code can be loaded from the storage system 107 into the memory 105 as well as into the processing device 103. The memory 105 can be any type of random access memory subsystem. The memory serves as a temporary storage for the code being loaded and executed by the processing device 103.

Storage system 107 can be any type of storage system or set of storage devices. A 'set,' as used herein, refers to any positive whole number of items including one item. The code and programs stored in the storage system 107 can include kernel code 109 including trace code 123, application code 117 including conditional code 119, compiler 113, code patching program 115, patch table 121, patch code 127 and executable code 129.

In one embodiment, the computer system 101 can be in communication with other computing devices or storage devices 131 over a network 111. These remote computer or storage devices 131 can provide additional locations for storing data, code or programs such as kernel code including trace code, compilers, code patchers, patch code, patch tables and applications including conditional code. In one example embodiment, the remote storage device 131 can store application code 133 to be executed by the computer system 101. The application code 133 includes conditional code 135.

The network 111 can include any type of communication system including a local area network, a wide area network, such as the Internet, or a similar communication system. The network 111 can be composed of any number of intermediary computing devices including any number of networking or computing devices. The network 111 can include any combination of wired and wireless communication mediums.

The kernel code 109 can be executable code for any operating systems such as the Linux kernel. The kernel code 109 can include a number of trace points or trace code sections 123. A trace code 123 is an optional or conditional code that is to be executed when an associated variable is set or a specific condition is met in the execution environment. Trace code 123 tracks the status of the operation of the kernel for use in monitoring or debugging. In other embodiments, other types of conditional code can be utilized in the kernel code 109. The trace code 123 is provided by way of example. One of ordinary skill in the art would understand the principles and structures described in regard to this example are applicable to other types of conditional code.

Application code 117 and other programs can also include conditional code segments 119. These are sections of the application code 117 that are to be executed when certain variables or conditions are met in the execution environment. Kernel code 109 and application code 117 are source codes primarily composed in a high level language. A compiler 113 processes these codes to generate executable code 129. During the compilation of the kernel code 109 or application code 117, the compiler 113 identifies the instances of trace code 123 or the other conditional code 119. Any number of trace code 123 or conditional code 119 segments can be present in kernel code 109 or application code 117. Each trace code 123 or conditional code 119 segment is separately compiled from the executable code 129 and stored in a patch code file 127 or a set of patch code files.

The patch table 121 stores a set of entries that include an address of each trace code 123 or other conditional code 119 in the executable code 129 as well as its location in the patch code 127. An associated label or variable name can also be included in each entry in the patch table 121. The patch table 121 can be utilized by a code patcher 115, which at run-time analyzes the variable settings for the application or kernel and identifies those variables or labels that have been set as operative and looks up the corresponding compiled kernel or application conditional code segments in the patch table 121. The code patcher 115 then updates the executable code 129 using the corresponding patch code identified in the patch table 121. This improves the efficiency of the processing device because it only executes and loads instructions that are to be executed and not conditional code segments that are not to be executed.

Figure 2:
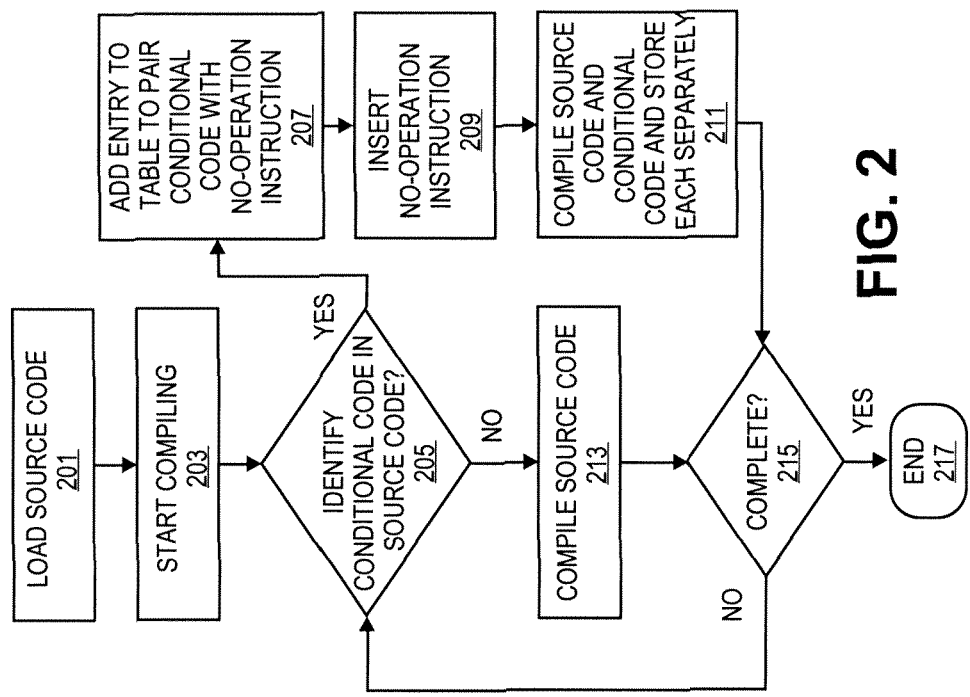
FIG. 2 is a flowchart of one embodiment of a process for compile-time optimization of conditional statements.

FIG. 2 is a flowchart of one embodiment of the process for compile-time conditional code optimization. In one embodiment, the process is initiated by the identification and loading of the source code to be compiled (Block 201). The source code can be kernel code, application code or similar program code. The source code is composed in a high-level language such as C or C++. The source code can be identified as a command line parameter or similar input to a compiler such as GCC or a similar compiler.

The compiler then starts a normal compilation process of the source code (Block 203). If a conditional code segment, such as a trace, is identified in the source code during the compilation process (Block 205), then an entry is created in a table, referred to herein as a 'patch table,' by the compiler (Block 207). The patch table entry includes an address of a no-operation instruction, sometimes referred to as a 'nop' or 'noop' instruction, that replaces the conditional code in the executable code being generated from the current source code. The entry also includes the location of the compiled conditional code, thereby pairing the no-operation instruction with the compiled conditional code. The compiled conditional code is stored in a separate file, referred to herein as 'the patch code,' or a different section of the same file that the source code is being compiled into.

The no-operation instruction is then inserted in place of the conditional code in the executable code by the compiler (Block 209). Any type of no-operation instruction can be inserted into the code. The conditional code is compiled and stored in a separate location from the executable code being generated from the source code (Block 211). A check is then made to determine whether the compilation process has been completed (Block 215). The compilation process is complete when the compiler has processed all of the source code in a target file. If the compiler has processed the entire source code, then the compilation process ends (Block 217). However, if the compilation process is not complete, then the compiler process continues to compile the instructions in the source code and continues to identify the conditional code in the source code (Block 205). All code segments that are not part of a conditional code are compiled using conventional techniques to generate the executable code based on the source code (Block 213). The compiler continues until the entire source code is compiled.

In one example embodiment, the code optimization process utilizes an asm statement to implement the construction of the patch tables.

In one embodiment the asm statement is a new 'asm goto' statement that allows branching to a label and ultimately to compiled code. The asm statement can be incorporated into the source code as a macro such as a 'STATIC_JUMP_IF( )' macro that can be coded as:

```
#ifdef HAVE_STATIC_JUMP
#define STATIC_JUMP_IF(tag, label, cond)
asm goto ("1:" /* 5-byte insn */
P6_NOP5
".pushsection ___jump_table, \"a\" \n\t"
__ASM_PTR "1b, %l[" #label "], %c0 \n\t"
".popsection \n\t"
: : "i" (__sjstrtab_##tag) : : label)
#else
#define STATIC_JUMP_IF(tag, label, cond)
if (unlikely(cond))
goto label;
#endif /* !HAVE_STATIC_JUMP */
which can be used as:
STATIC_JUMP_IF(trace, trace_label, jump_enabled);
printk("not doing tracing\n");
if (0) {
trace_label:
printk("doing tracing: %d\n", file);
}
```

If 'HAVE_STATIC_JUMP' is defined, which will depend ultimately on the existence of 'asm goto' in the compiler version, then a nop followed by a jump around the dormant (disabled) tracing code is present in the code. The 'STATIC_JUMP_IF( )' macro produces a 'jump_table', which has the following format: [instruction address] [jump target] [tracepoint name]. To enable a conditional code patch, the code located at the 'instruction address' is replaced with a jump instruction to the code at the 'jump target'. In another embodiment, the code at the instruction address is replaced with the code at the jump target. In one example embodiment, an ftrace infrastructure can be utilized to perform the patching, which uses 'stop_machine,' or a similar code patching technique can be utilized.

Figure 3:
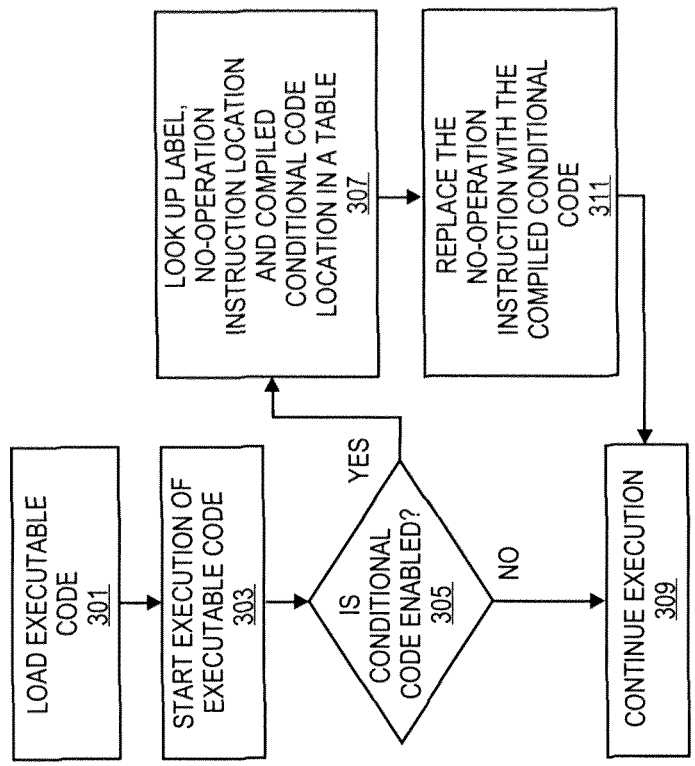
FIG. 3 is a flowchart of one embodiment of a process for run-time optimization of conditional statements.

FIG. 3 is a diagram of one embodiment of the process of run-time conditional code optimization. This process is initiated during the loading of a compiled or executable code by the operating system, BIOS or similar component of a computer system (Block 301). The execution of the executable code starts and continues conventionally (Block 303). The initiation of the execution of the executable code includes a check of each of the global variables or similar execution environment conditions that can affect whether conditional code in the loaded executable code is enabled to be executed (Block 305).

For each variable that is set or condition that is met, a look-up is made in the patch table to identify the corresponding compiled conditional code to be inserted into the loaded executable code (Block 307). The look up includes a search for matching labels and retrieval of the location of the corresponding no-operation instructions in the executable code and the retrieval of the location of the corresponding compiled conditional code. The identified compiled conditional code is then inserted by replacing the no-operation instruction with a jump instruction to the compiled conditional code in the patch code storage location specified in the patch table. In another embodiment, the compiled conditional code is copied and inserted into the loaded executable code from the patch code storage location specified in the patch table to replace the identified no-operation instruction (Block 311). This inserted compiled conditional code is then part of the executable code and the execution of the code can continue normally (Block 309). Inserting only those segments of the conditional code that are to be executed minimizes the overhead of the processing device allowing it to avoid the unnecessary loads caused by conditional code segments that are not to be executed, thereby improving the efficiency of the processing device and the computer system.

Figure 4:
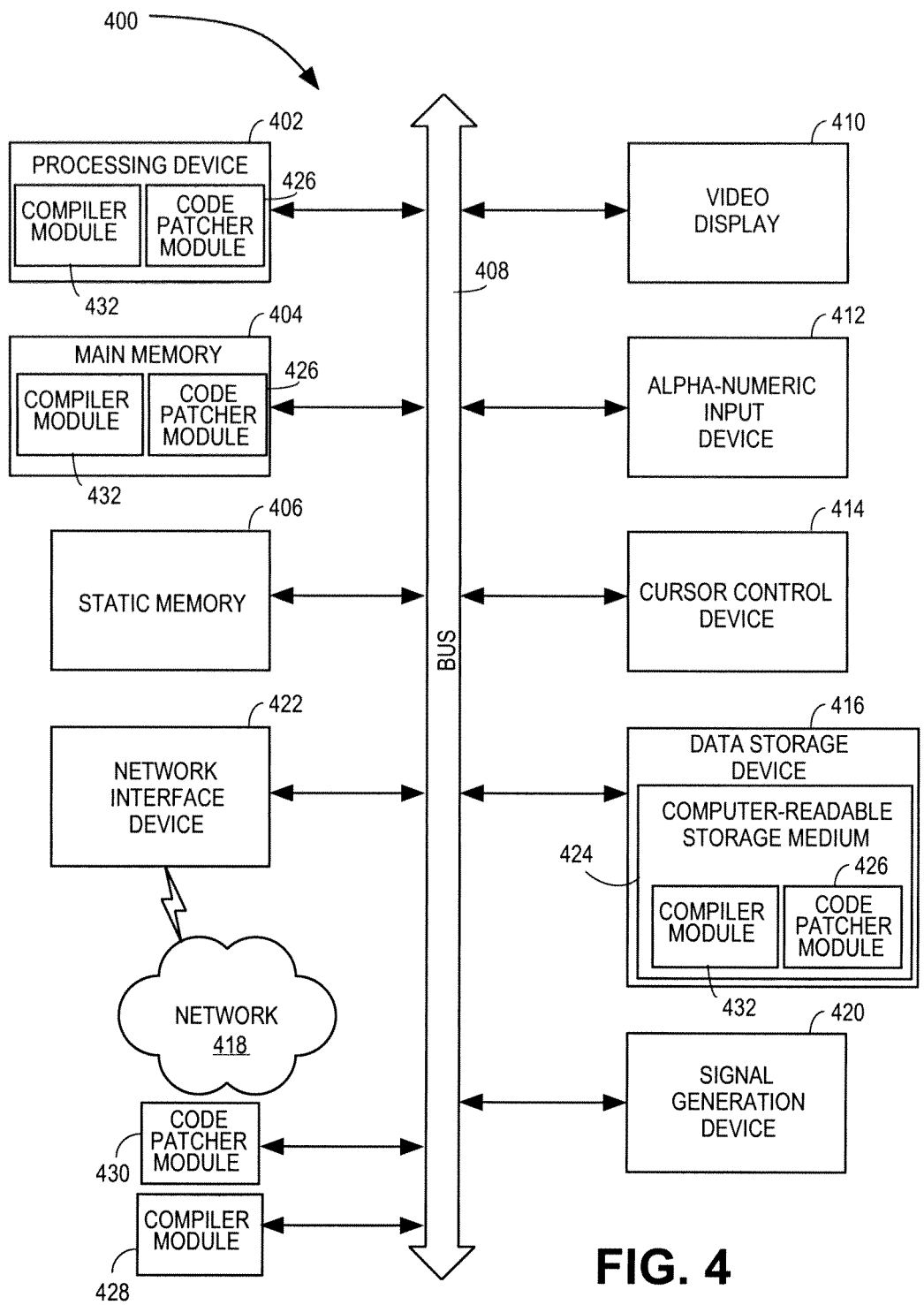
FIG. 4 is a diagram of one embodiment of a system for optimization of conditional statements.

FIG. 4 is a diagram illustrating one embodiment of a system. Within the computer system 400 is a set of instructions for causing the computer or other machine to perform any one or more of the methodologies discussed herein. In alternative embodiments, the computer system 400 may be connected (e.g., networked) to other machines in a LAN, an intranet, an extranet, or the Internet. The computer system 400 can operate in the capacity of a server or a client machine (e.g., a client computer executing a code patcher module and a server computer executing a computer module) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computer is illustrated, the term "computer" shall also be taken to include any collection of computers or other machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable storage medium), which communicate with each other via a bus 408.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. In another embodiment, the processing device 402 may also be one or more special-purpose processing devices such as an application specific integrated circuit (ASIC), a field programmable gate array (FPGA), a digital signal processor (DSP), network processor, or the like. The processing device 402 is configured to execute resource management module and resource directory 426 for performing the operations and steps discussed herein.

The computer system 400 can further include a network interface device 422. The computer system 400 also can include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 can include a machine-readable storage medium (or more specifically a computer-readable storage medium) 424 on which is stored one or more sets of instructions (e.g., code patcher module 426 and computer module 432) embodying any one or more of the methodologies or functions described herein. The code patcher module 426 and compiler module 432 can also reside, completely or at least partially, within the main memory 404 and within the processing device 502 during execution thereof by the computer system 400, the main memory 404 and the processing device 402 also constituting machine-readable storage media. The code patcher module 426 and compiler module 437 can further be transmitted or received over a network 418 via the network interface device 422.

The machine-readable storage medium 424 can also be used to store the code patcher module 426 and compiler module 432 persistently. While the machine-readable storage medium 424 is shown in an exemplary embodiment to be a single medium, the term "machine-readable storage medium" and also "computer-readable storage medium" should be taken to include a single medium or multiple media (e.g., a centralized or distributed database, and/or associated caches and servers) that store the one or more sets of instructions. The terms "machine-readable storage medium" and "computer-readable storage medium" shall also be taken to include any medium that is capable of storing or encoding a set of instructions for execution by the machine and that cause the machine to perform any one or more of the methodologies of the present invention. The terms "machine-readable storage medium" and "computer-readable storage medium" shall accordingly be taken to include, but not be limited to, solid-state memories, and optical and magnetic media.

In one embodiment, the code patcher module 430 and compiler module 428 can be implemented as separate hardware components such as application specific integrated circuits (ASICs). The code patcher module 430 and compiler module 428 can communicate with the other components over the base 408.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "adding," "compiling," "storing," "loading," "checking," "replacing," "looking-up," "matching" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems has been described in the description above. In addition, the present invention is not described with reference to any particular programming language. It will be appreciated that a variety of programming languages may be used to implement the teachings of the invention as described herein. Further, while software and hardware embodiments have described herein to illustrate the range of possible implementations, those skilled in the art would understand that any combination of these techniques can be utilized, such that the invention would not have an entirely hardware or software implementation, for example, any of the functions or algorithms described herein could be implemented in micro-coded hardware components.

Thus, a method and apparatus for conditional code optimization has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    identifying a conditional code in a source code, wherein the source code comprises a code segment that is not part of the conditional code;
    adding to a table an entry that associates a no-operation instruction with the conditional code to enable execution of the conditional code;
    compiling the code segment of the source code that is not part of the conditional code to generate an executable code;
    upon enabling of execution of the conditional code, inserting, by a processing device, the no-operation instruction into the executable code in place of the conditional code; and
    compiling the conditional code and storing the compiled conditional code separately from the executable code.

2. The method of claim 1, wherein the conditional code is a trace.

3. The method of claim 1, wherein the entry to the table comprises an address of the no-operation instruction in the executable code and an address at which the compiled conditional code is stored.

4. The method of claim 3, wherein the entry to the table comprises a label for a condition or variable to be checked to enable the conditional code.

5. The method of claim 1, wherein the conditional code in the source code comprises a branch out of assembly code into compiled code.

6. A method comprising:
    compiling a code segment of a source code that is not part of a conditional code of the source code to generate an executable code, wherein the conditional code is compiled separately from the executable code, the compiled conditional code is generated during compilation of the source code and stored in a second file, wherein the second file is separate from a first file that stores the executable code;
    identifying a no-operation instruction in the executable code; and
    upon enabling of execution of the compiled conditional code, replacing, by the processing device, the compiled conditional code in the source code with the no-operation instruction.

7. The method of claim 6, wherein the compiled conditional code is a trace.

8. The method of claim 6, further comprising:
    matching a global-variable with a label in a table to identify each corresponding no-operation instruction in the executable code.

9. The method of claim 8, wherein the table comprises an entry with an address of the no-operation instruction in the executable code and an address of the compiled conditional code.

10. The method of claim 9, further comprising:
    replacing the no-operation instruction with a jump instruction to the compiled conditional code in the executable code.

11. A non-transitory computer-readable storage medium having instructions stored therein, which when executed cause a processing device to:
    identify a conditional code in a source code, wherein the source code comprises a code segment that is not part of the conditional code;
    add to a table an entry that associates a no-operation instruction with the conditional code to enable execution of the conditional code;
    compile the code segment of the source code that is not part of the conditional code to generate an executable code;
    upon enabling of execution of the conditional code, insert, by the processing device, the no-operation instruction into the executable code in place of the conditional code; and
    compile the conditional code and storing the compiled conditional code separately from the executable code.

12. The non-transitory computer-readable storage medium of claim 11, wherein the conditional code is a trace.

13. The non-transitory computer-readable storage medium of claim 11, wherein the entry to the table comprises an address of the no-operation instruction in the executable code and an address at which the compiled conditional code is stored.

14. The non-transitory computer-readable storage medium of claim 11, wherein the entry to the table comprises a label for a condition or variable to be checked to enable the conditional code.

15. The non-transitory computer-readable storage medium of claim 11, wherein the conditional code in the source code comprises a branch out of assembly code into compiled code.

16. A non-transitory computer-readable storage medium having instructions stored therein, which when executed cause a processing device to:

compile a code segment of a source code that is not part of a conditional code of the source code to generate an executable code, wherein the conditional code is compiled separately from the executable code, the compiled conditional code is generated during compilation of the source code and stored in a second file, wherein the second file is separate from a first file that stores the executable code;

identify a no-operation instruction in the executable code; and upon enabling of execution of the compiled conditional code, replace, by the processing device, the compiled conditional code in the source code with the no-operation instruction.

17. The non-transitory computer-readable storage medium of claim 16, wherein the conditional code is a trace.

18. The non-transitory computer-readable storage medium of claim 16, wherein the set of operations further comprises:

matching a global-variable with a label in a table to identify each corresponding no-operation instruction in the executable code.

19. The non-transitory computer-readable storage medium of claim 18, wherein the table comprises an entry with an address of the no-operation instruction in the executable code and an address of the compiled conditional code.

20. The non-transitory computer-readable storage medium of claim 19, wherein the set of operations further comprises:

replacing the no-operation instruction with a jump instruction to the compiled conditional code in the executable code.

* * * * *